(12) United States Patent
Handel et al.

(10) Patent No.: US 8,175,926 B1
(45) Date of Patent: May 8, 2012

(54) EVENT AND SERVICES INVENTORY MANAGEMENT SYSTEM

(75) Inventors: Sean Handel, Moss Beach, CA (US); Gabriel Sandoval, Los Gatos, CA (US); Mark Orttung, Menlo Park, CA (US)

(73) Assignee: Rearden Commerce, Inc., San Mateo, CA (US)

( * ) Notice: Subject to any disclaimer, the term of this patent is extended or adjusted under 35 U.S.C. 154(b) by 1150 days.

(21) Appl. No.: 11/395,883

(22) Filed: Mar. 31, 2006

(51) Int. Cl.
*G06Q 30/00* (2006.01)
*G06Q 10/00* (2006.01)

(52) U.S. Cl. .............................. 705/26; 705/1

(58) Field of Classification Search ................ 705/26, 705/1
See application file for complete search history.

(56) References Cited

U.S. PATENT DOCUMENTS

| | | | |
|---|---|---|---|
| 5,237,499 A | 8/1993 | Garback | |
| 5,331,546 A | 7/1994 | Webber et al. | |
| 5,794,207 A | 8/1998 | Walker et al. | |
| 5,832,453 A | 11/1998 | O'Brien | |
| 5,930,761 A * | 7/1999 | O'Toole | 705/5 |
| 5,948,040 A | 9/1999 | DeLorme et al. | |
| 5,991,742 A | 11/1999 | Tran | |
| 6,023,679 A | 2/2000 | Acebo et al. | |
| 6,067,532 A * | 5/2000 | Gebb | 705/37 |
| 6,272,474 B1 | 8/2001 | Garcia | |
| 6,308,159 B1 * | 10/2001 | Strohl | 705/5 |
| 6,442,526 B1 | 8/2002 | Vance et al. | |
| 6,477,520 B1 | 11/2002 | Malaviya et al. | |
| 6,701,311 B2 | 3/2004 | Biebesheimer et al. | |
| 6,711,548 B1 | 3/2004 | Rosenblatt | |
| 6,965,868 B1 * | 11/2005 | Bednarek | 705/7.14 |
| 7,050,986 B1 | 5/2006 | Vance et al. | |
| 7,099,841 B1 * | 8/2006 | Hall et al. | 705/37 |
| 7,127,408 B2 * | 10/2006 | Rosen | 705/6 |
| 7,194,417 B1 | 3/2007 | Jones | |
| 7,216,109 B1 | 5/2007 | Donner | |
| 7,228,313 B1 | 6/2007 | Hand et al. | |
| 7,302,399 B1 | 11/2007 | Donovan et al. | |
| 7,349,875 B1 * | 3/2008 | Hood et al. | 705/35 |
| 7,363,267 B1 | 4/2008 | Vincent et al. | |
| 7,376,603 B1 * | 5/2008 | Mayr et al. | 705/35 |
| 7,401,029 B2 | 7/2008 | Gillespie | |
| 7,457,950 B1 | 11/2008 | Brickell et al. | |
| 7,499,864 B2 | 3/2009 | Campbell et al. | |
| 2001/0034663 A1 * | 10/2001 | Teveler et al. | 705/26 |
| 2002/0049658 A1 * | 4/2002 | Davidson et al. | 705/37 |
| 2002/0069155 A1 * | 6/2002 | Nafeh et al. | 705/37 |

(Continued)

OTHER PUBLICATIONS

Billington, Corey A., et al., U.S. Appl. No. 11/093,353, entitled "Method and System for Anonymous Reslae of Inventory and Profitmaking From Sale of Unused Inventory", filed Mar. 29, 2005.

(Continued)

*Primary Examiner* — Elaine Gort
*Assistant Examiner* — Ashford S Hayles
(74) *Attorney, Agent, or Firm* — Greenberg Traurig, LLP

(57) ABSTRACT

A method and system are described for event and service inventory management. One embodiment comprises: in response to a user request for tickets to an event, searching a database for available tickets of a set of tickets purchased prior in time; displaying to a user information about booked but unused tickets; and, in response to identifying unused tickets, allowing the user to book the available event tickets, without the user having received separate authorization to obtain tickets to the event.

17 Claims, 3 Drawing Sheets

U.S. PATENT DOCUMENTS

| | | | |
|---|---|---|---|
| 2002/0072937 | A1 | 6/2002 | Domenick et al. |
| 2002/0099599 | A1* | 7/2002 | Minassian ....................... 705/13 |
| 2002/0128922 | A1* | 9/2002 | Joao ................ 705/26 |
| 2002/0198629 | A1 | 12/2002 | Ellis |
| 2003/0078815 | A1* | 4/2003 | Parsons ............................. 705/4 |
| 2003/0233278 | A1* | 12/2003 | Marshall ......................... 705/14 |
| 2004/0006497 | A1* | 1/2004 | Nestor et al. ...................... 705/5 |
| 2004/0093302 | A1* | 5/2004 | Baker et al. ..................... 705/37 |
| 2004/0111303 | A1* | 6/2004 | Francis ............................. 705/5 |
| 2004/0117281 | A1 | 6/2004 | Clydesdale |
| 2004/0237077 | A1* | 11/2004 | Cole et al. ..................... 717/162 |
| 2005/0080672 | A1* | 4/2005 | Courtion et al. ................ 705/14 |
| 2005/0102154 | A1* | 5/2005 | Dodd et al. ....................... 705/1 |
| 2005/0228723 | A1* | 10/2005 | Malik ............................. 705/26 |
| 2005/0246265 | A1* | 11/2005 | McHale et al. ................. 705/37 |
| 2006/0009990 | A1* | 1/2006 | McCormick ...................... 705/1 |
| 2006/0085284 | A1* | 4/2006 | Cardenas ........................ 705/26 |
| 2006/0095344 | A1* | 5/2006 | Nakfoor .......................... 705/26 |
| 2006/0108418 | A1* | 5/2006 | Rice .............................. 235/382 |
| 2006/0190315 | A1* | 8/2006 | Aggarwal et al. ................. 705/9 |
| 2006/0247970 | A1* | 11/2006 | Sattelmaier .................... 705/14 |
| 2006/0287914 | A1* | 12/2006 | Shelley .......................... 705/14 |
| 2007/0022003 | A1* | 1/2007 | Chao et al. ..................... 705/14 |
| 2007/0055554 | A1* | 3/2007 | Sussman et al. .................. 705/5 |
| 2007/0118419 | A1* | 5/2007 | Maga et al. .................... 705/10 |
| 2007/0226021 | A1* | 9/2007 | Goodpasture ..................... 705/5 |
| 2008/0005017 | A1* | 1/2008 | Poster ............................ 705/39 |
| 2008/0015871 | A1* | 1/2008 | Eder ................................. 705/1 |
| 2009/0043637 | A1* | 2/2009 | Eder ............................... 705/10 |
| 2010/0241501 | A1* | 9/2010 | Marshall ................... 705/14.13 |

OTHER PUBLICATIONS

Billington, Corey A. et al., U.S. Appl. No. 11/096,635, entitled "Method and System for Anonymous Resale of Inventory and Profitmaking From Sale of Unused Inventory," filed Mar. 31, 2005. ProQuest Search.
Wehrle, John, "Slowing Economy is no reason to worry; what goes down must go up; [Fifth Star Lift Edition]", St. Louis Post-Dispatch, St. Louis, Mo., Apr. 17, 2001, p. 3.
Handel, Sean et al., U.S. Appl. No. 11/395,883, entitled "Event and Services Inventory Management System", filed Mar. 31, 2006.
Transaction History of U.S. Appl. No. 11/093,353, filed Mar. 29, 2005, entitled "Method and System for Anonymous Resale of Inventory and Profit-Making From Sale of Unused Inventory."
Transaction History of U.S. Appl. No. 11/096,635, filed Mar. 31, 2005, entitled "Method and System for Anonymous Resale of Inventory and Profit-Making From Sale of Unused Inventory."
Transaction History of U.S. Appl. No. 11/240,741, filed Sep. 30, 2005, entitled "Event and Services Inventory Management System."
Transaction History of U.S. Appl. No. 11/395,883, filed Mar. 31, 2006, entitled "Event and Services Inventory Management System."
"Federation Cooperative," located at http://web.archive.ord/web/20020119153 11/http://www.fedcoop.com, Jan. 19, 2002.

* cited by examiner

EVENT AND SERVICES INVENTORY MANAGEMENT SYSTEM

BACKGROUND OF THE INVENTION

Often companies may purchase tickets to events, such as sporting events, to entertain guests, visiting executives, high-performing employees, or other appropriate recipients. If not well managed, ticket purchases may become an excessive expense. Also, often event tickets must be purchased in blocks for best pricing. However, not all purchasers can find recipients for all tickets, leaving some tickets unused or given away at random, and thus a wasted expense.

What is clearly needed is a system and method for managing purchase and inventory of such event tickets in a way that is most economical and beneficial to the company.

SUMMARY

A method and system are described for event and service inventory management. One embodiment comprises: in response to a user request for tickets to an event, searching a database for available tickets of a set of tickets purchased prior in time; displaying to a user information about booked but unused tickets; and, in response to identifying unused tickets, allowing the user to book the available event tickets, without the user having received separate authorization to obtain tickets to the event.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
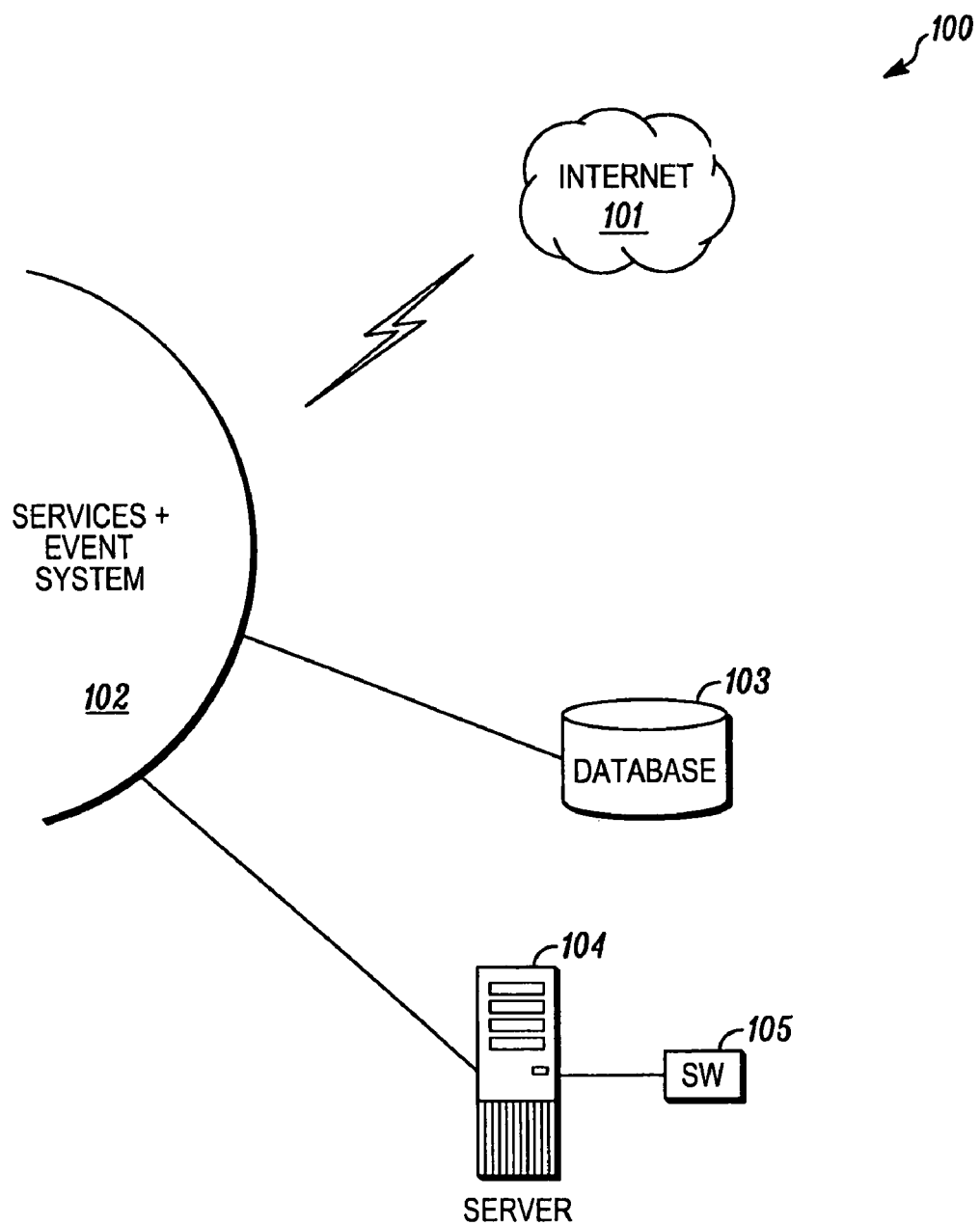
FIG. 1 shows an overview of services and event system and its associated elements according to the present embodiment.

FIG. 1 shows an overview 100 of services and event system 102 and its associated elements according to the present embodiment. It could be a stand-alone system, or it could be integrated with other service systems. Symbolically shown associated with system 102 are a database 103 and a server 104 with a software instance 105. It is clear that there may be many variations in the architecture of the database, server, and associated software, with, for example, multiple servers, the database held on storage integrated into the server or in a separate computer, the server(s) containing other service system aspects as known to the inventor or dedicated solely to the usage of the present embodiment, etc. All such variations are well known to a person of knowledge in the art and do not affect the present embodiment as disclosed herein. System 102 is connected to the Internet 101. Internet 101 is for purposes of simplicity and clarity also representative of any other network(s), not shown, to which system 102 may be connected.

Figure 2:
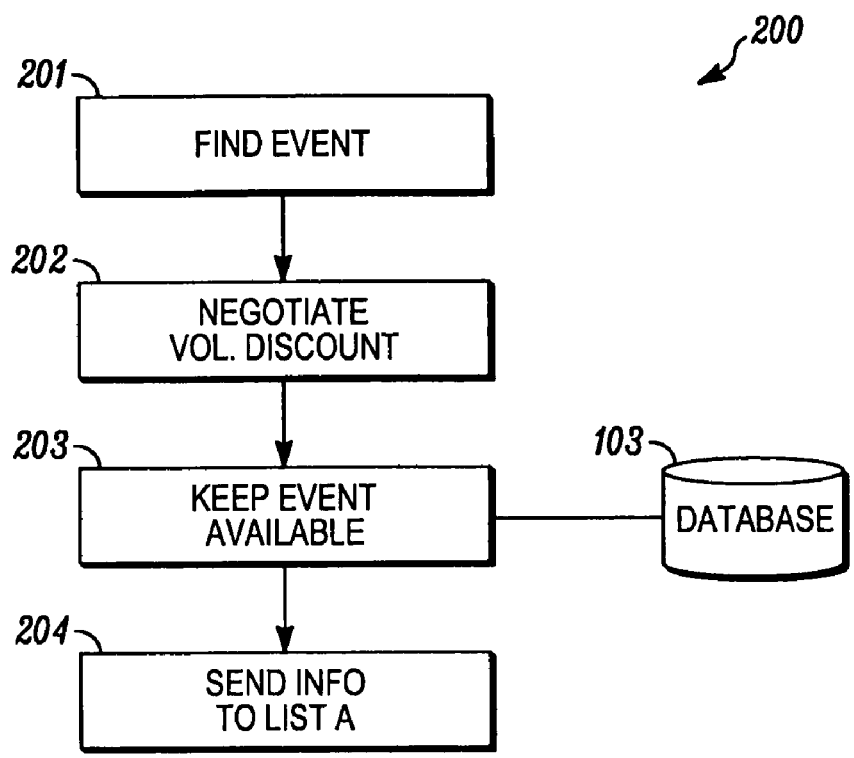
FIG. 2 shows the process by which a ticket block may be purchased according to the present embodiment.

FIG. 2 shows the process 200 by which a ticket block may be purchased according to the present embodiment. In step 201, the user initiates a search by the system for an appropriate event. The search may be limited to local database 103, or the event service system may connect over the Internet 101 or some other network to providers of event tickets. In step 202, a volume discount is negotiated with a ticket provider for a block of tickets; and in step 203, those tickets are marked as available and information about the event and its availability is stored in database 103. In step 204, information about available tickets is sent to an "A list" of potential interested parties who may want to or may be authorized to use the tickets to entertain important visitors, guests, deserving employees, etc. Also, in some cases, an executive suite, that has inherent access to games, may be expressed a set of virtual tickets. Other, similar cases may exist, where attending rights are inherent in a sponsorship etc.

Figure 3:
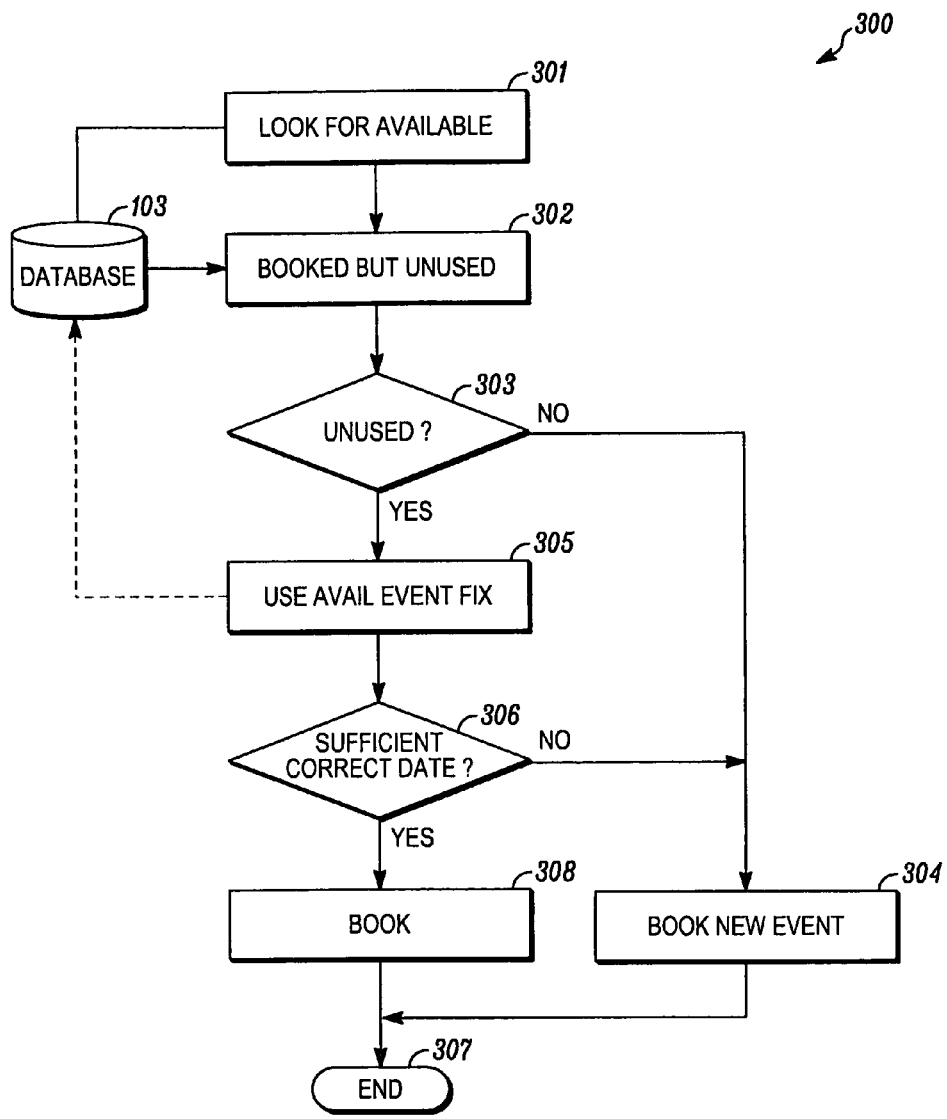
FIG. 3 shows the process by which an employee may acquire available tickets before being authorized to acquire new tickets, according to the present embodiment of the system.

FIG. 3 shows the process 300 by which an employee may acquire available tickets before being authorized to acquire new tickets, according to the present embodiment of the system. In step 301, the system searches database 103 for available tickets. This search may be conducted by date, by event type, or by any other of various parameters. The search may also include checking with external suppliers (not shown) over Internet 101 or a functionally similar or equivalent private or public network. In step 302, information about booked but unused tickets is displayed to the user. In step 303, the process branches. If there are no unused tickets (no), the process moves to step 304, where, with proper authorization (not shown), new tickets may be purchased. At this point, the process terminates at step 307. If there are any unused tickets (yes), the process moves to step 304, where the system books the available event tickets in a process essentially similar to the process described above in the description of FIG. 2. If there are unused tickets, the process again branches in step 305 to use those existing tickets. If they are sufficient and meet the desired criteria (yes), such as date and event type, the ticket booking process is completed in step 308 and the process terminates at step 307. If the unused tickets do not meet the needs of the user (no), then the process branches to step 304, where, with proper authorization, new tickets may be purchased, and the process terminates at step 307. In some cases, certain authorized persons (e.g., high-ranking executives) may have the privilege of overriding the system to obtain new tickets for the event they want, even if other event tickets are available. Also, unused tickets may be offered for sale at a discounted price to employees or may be resold through a third party (such as Stub Hub or RazorGator) or an intra-company unused ticket exchange service.

In some cases, the system would also calculate the "internal usage value" vs. the "external street value" for the owner. The "internal usage value" is the perceived value of having some employee of the company using the ticket or ticket block to entertain a client or for some other purpose. This can be calculated based on a variety of inputs. For example, a VP or above requesting it gives the ticket 50 points, the importance of the client can given n more points, the availability of other similar tickets gives the ticket value m more points, etc. The total is the "internal usage value".

The "external street value" can be calculated by an algorithm that takes into account the original price of the ticket, the rate at which the event sold out, the current availability of tickets on the primary and secondary markets, number of other people requesting similar tickets, current bid price for such a ticket, etc.

Comparing the internal value vs. the external value can help a company determine if and when it should sell previously purchased tickets on the open market, providing an opportunity to effectively offload unused tickets at the right price and the right time and to determine which tickets should be offloaded.

It is clear that many modifications and variations of this embodiment may be made by one skilled in the art without departing from the spirit of the novel art of this disclosure.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

What is claimed is:

1. A computer implemented method comprising:
in response to a request of a user employed by an organization for tickets to an event, searching, via a computing device, a database for available tickets of a set of tickets purchased prior in time by a procuring organization;
displaying, via the computing device, to the user information about the available tickets;
in response to identifying the available tickets, allowing, via the computing device, the user employed by the organization to book the available tickets, the allowing comprising determining that a usage value of the available tickets internal to the organization is equal to or greater than a monetary value of the available tickets external to the organization, the usage value internal to the organization being calculated based at least in part on classification of a guest to accompany the user in use of the available tickets;
when there are no available tickets, authorizing the user to purchase new tickets; and
when the monetary value of the available tickets external to the organization is greater than the usage value internal to the organization, offloading the available tickets on an open market external to the organization.

2. The method of claim 1, wherein the searching is conducted by one or more of date or event type.

3. The method of claim 2, wherein the searching is performed on a database stored remotely to a system receiving the request for the available tickets.

4. The method of claim 2, further comprising authorizing the user to purchase the available tickets to the event in response to the available tickets failing to meet a specified criteria.

5. The method of claim 2, further comprising authorizing the user to purchase the available tickets to the event in response to the user being of a predetermined classification.

6. The method of claim 1, wherein the user is associated with the procuring organization.

7. The method of 1, wherein the usage value internal to the organization is calculated based at least in part on one or more of classification of the user requesting the available tickets, and availability of other related tickets.

8. The method of claim 1, wherein the monetary value of the available tickets external to the organization is based on an algorithm that takes into account at least one or more of an original price of the available tickets, a rate at which the event sold out, a current availability of tickets on primary and secondary markets, or a number of other users requesting related tickets.

9. A non-transitory machine readable medium having stored thereon a set of instructions which when executed by a computing device, cause the computing device to perform a method comprising:
in response to a request of a user employed by an organization for tickets to an event, searching a database for available tickets of a set of tickets purchased prior in time by a procuring organization;
displaying to the user information about the available tickets;
in response to identifying the available tickets, allowing, via the computing device, the user employed by the organization to book the available tickets, the allowing comprising determining that a usage value of the available tickets internal to the organization is equal to or greater than a monetary value of the available tickets external to the organization, the usage value internal to the organization being calculated based at least in part on classification of a guest to accompany the user in use of the available tickets;
when there are no available tickets, authorizing the user to purchase new tickets; and
when the monetary value of the available tickets external to the organization is greater than the usage value internal to the organization, offloading the available tickets on an open market external to the organization.

10. The machine readable medium of claim 9, wherein the searching is conducted by one or more of date or event type.

11. The machine readable medium of claim 10, wherein the searching is performed on a database stored remotely to a system receiving the request for the available tickets.

12. The machine readable medium of claim 11, further comprising authorizing the user to purchase the available tickets to the event in response to the available tickets failing to meet a specified criteria.

13. The machine readable medium of claim 12, further comprising authorizing the user to purchase the available tickets to the event in response to the user being of a predetermined classification.

14. The machine readable medium of claim 9, wherein the user is associated with the procuring organization.

15. The machine readable medium of 9, wherein the usage value internal to the organization is calculated based at least in part on one or more of classification of the user requesting the available tickets, and availability of other related tickets.

16. The machine readable medium of claim 9, wherein the monetary value of the available tickets external to the organization is based on an algorithm that takes into account at least one or more of an original price of the available tickets, a rate at which the event sold out, a current availability of tickets on primary and secondary markets, or a number of other users requesting related tickets.

17. A system comprising:
at least one computing device configured to:
search a database for available tickets of a set of tickets purchased prior in time by a procuring organization, in response to a request of a user employed by an organization for tickets to an event;
display to the user information about the available tickets;
allow the user employed by the organization to book the available tickets, in response to identifying the available tickets, the allowing comprising a determination that a usage value of the available tickets internal to the organization is equal to or greater than a monetary value of the available tickets external to the organization, the usage value internal to the organization being calculated based at least in part on classification of a guest to accompany the user in use of the available tickets;
when there are no available tickets, authorize the user to purchase new tickets; and
when the monetary value of the available tickets external to the organization is greater than the usage value internal to the organization, offload the available tickets on an open market external to the organization.

* * * * *